United States Patent [19]

Lachonius

[11] Patent Number: 4,535,963
[45] Date of Patent: Aug. 20, 1985

[54] HOLDER FOR RAILINGS, LISTS AND THE LIKE

[75] Inventor: Leif Lachonius, Surte, Sweden

[73] Assignee: Aktiebolaget SKF, Goteborg, Sweden

[21] Appl. No.: 361,569

[22] Filed: Mar. 25, 1982

[30] Foreign Application Priority Data

Apr. 30, 1981 [SE] Sweden ............... 8102745

[51] Int. Cl.³ ............................... B65G 15/60
[52] U.S. Cl. .................... 248/251; 198/836
[58] Field of Search .......... 248/251; 52/716; 256/70, 68, 59; 198/836

[56] References Cited

U.S. PATENT DOCUMENTS

| | | | |
|---|---|---|---|
| 3,258,250 | 6/1966 | McMullin | 256/68 |
| 3,526,390 | 9/1970 | Horgan | 256/70 |
| 3,535,204 | 10/1970 | Truxa | 256/59 |
| 3,605,994 | 3/1970 | Parlette | 198/836 |
| 3,776,350 | 12/1973 | Tice | 198/836 |
| 3,788,457 | 1/1974 | Valentino | 198/836 |
| 3,800,938 | 4/1974 | Stone | 198/836 |
| 3,842,564 | 10/1974 | Brown | 248/251 |

*Primary Examiner*—Reinaldo P. Machado
*Assistant Examiner*—Alvin Chin-Shue
*Attorney, Agent, or Firm*—Eugene E. Renz, Jr.

[57] ABSTRACT

The invention refers to a holder for railings, lists and the like and it is characterized thereby that it incorporates a body (7) for mounting of the holder to a frame (2) and a holder portion extending from the body (7). This holder portion has in cross-section a U-shaped profile and has on the inner side of one of the shanks (9), a boss (5) intended to grip into the railing or the list (3). On the inner side of the other shank (9) is provided a recess, which is intended to cooperate with a locking pin (6) for arresting the railing or the list (3) to the holder.

1 Claim, 1 Drawing Figure

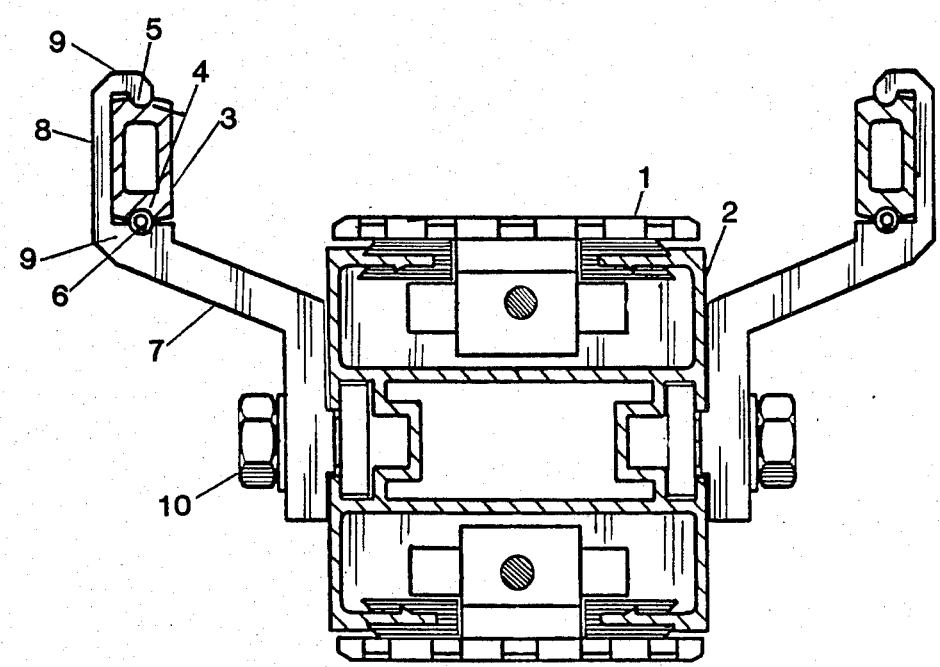

HOLDER FOR RAILINGS, LISTS AND THE LIKE

BACKGROUND OF THE INVENTION

The present invention refers to a holder, which is intended to support railings, lists or similar devices.

A larger number of different devices for supporting longitudinal objects such as lists and railings are previously known. Such devices often incorporate screws by means of which it is possible to fasten the list to the holder device. Devices are also known, at which the elasticity of the list or of the holder is utilized and the list is snapped to the holder. An example of such lists are floor and door rails made of plastic material.

Sometimes it is however necessary to have a stable railing or a stable list. A further demand may be that e.g. one side of the railing must be quite smooth in order to ascertain that objects can not get caught in the railing. It is furthermore often desirable that the rail shall not bend outwards from its attachment due to the powerful tightening of e.g. a screw. Screw attachments are on the whole not desirable at smooth railings.

With the present invention it has been attempted to remove the drawbacks in supporting lists, railings or the like by means of a holder, which is characterized by that it incorporates a body for mounting of the holder to a frame and a holder portion extending from the body and having in cross-section a U-shaped profile and that the side of one of the U-shanks facing the other shank is provided with a boss intended to grip into the railing, the list or the like and that the other shank on its side facing the first shank is provided with a recess intended to cooperate with a locking pin for arresting the railing, the list or the like to the holder.

The advantages achieved with the invention are that one side of the railing or the list will be entirely smooth and free from screw holes and the like. Furthermore the list and the holder can both be manufactured and mounted in a very expedient way. The material can preferably be aluminum.

The invention will hereinafter be further described with reference to the accompanying drawing, which shows a section through a conveyor track with railings and holder. In the FIGURE is shown an endless conveyor track 1 which slides on a frame 2. As illustrated, the frame 2 is in the form of a girder which is of symmetrical configuration about a horizontal plane and defines conveyor belt forward and return runs between opposing horizontal outer sides 2a, 2b of the girder. The girder has a transverse web portion 2c having at opposite sides of the vertical plane through the center of the girder a pair of open longitudinally extending channels 2d. In order to ascertain that the objects, which shall be conveyed on the conveyor track 1 shall not fall off the track it is necessary to arrange railings along the track. The railing 3 shown in the FIGURE consists of a profile-drawn aluminum list. The list is provided with two recesses 4, which cooperate at one hand with a boss 5 on the holder, and on the other hand with a locking pin 6 between the list and the holder. The holder consists, as shown, of a body 7 from which a U-shaped holder part extends. The holder part has a web 8 and two shanks 9. The lower shank 9 is connected to the body 7 and forms no marked part of a U-profile. With the expression U-shape is hereby chiefly meant the inner surface of the U-profile. The body 7 is attached to the frame 2 by means of e.g. a screw 10. More specifically, the holder is secured to the two opposing sides 2a, 2b of the frame by means of a nut member 11 which engages in the channel 2d and a screw member 10 which engages through the lower portion 7a of the body 7 to facilitate easy and quick assembly of the holder at a selected location along the side of the frame. Note that the inner face 7b of the lower portion 7a of the body 7 has a shoulder 7c which engages in the elongated channel 2d formed at the entrance end 2e, which entrance end and elongated channel form a T-shaped channel.

It is evident from the drawing that the side of the railing 3, which faces the conveyor track 1 is quite smooth. There are no screw heads or the like on this list.

It is important that the recess 4 is made somewhat spacious in relation to the boss 5. The reason for this is that the railing 3 sometimes extends along curves and as the holder is short and straight in its longitudinal direction, it is necessary that there is a play to make possible mounting in curves.

The locking pin 6 can be solid, but it is advantageous if it is made as a tubular pin with a slot, whereby it will be somewhat springy.

The list 3 shown in the drawing has been made symmetrical, whereby it cannot be mounted in an incorrect way. Such symmetry is not necessary in itself but it of course facilitates the mounting. If, however, the railing shall be used e.g. as a hand railing, it is possible that a portion of the list can be curved over the upper shank 9 whereby no obstacles for the hand will arise.

As mentioned above it is possible to manufacture the railing or the list 3 by profile-drawing. This can also be used for the holder, which after drawing is cut in appropriate pieces and provided with bores for the screws 10.

The invention is not limited to the embodiment shown. The body 7 may for instance be connected to the holder part at the upper end of the web 8 and it can be attached to another foundation than the frame 2 for the conveyor track 1. Such a supporting can facilitate the arrangement of a drip list for catching liquid which often drips from the conveyor track.

What is claimed is:

1. A holder for railings for a conveyor assembly including a frame in the form of a girder symmetrical about a horizontal plane and defining conveyor belt runs between opposing horizontal outer sides of said girder and having at opposite sides a pair of open longitudinally extending T-shaped channels, said channels having an entrance end in said horizontal outer side, said holder comprising a body adapted for mounting to the conveyor frame, said body having a shoulder which engages said entrance end and having an extension portion of U-shaped profile oriented so that the open end of said extension portion faces one of said conveyor belt runs, the confronting sides of said U-shaped profile being provided on one side with a boss intended to grip into the railing and on the other side with a recess, and a locking pin which cooperates with said recess for arresting the railing to said holder, means for connecting said holder to the conveyor frame including a nut member engageable in said channels and a screw member engaging through said holder and cooperating with said nut member to secure said holder to said frame.

* * * * *